Feb. 8, 1949. F. C. WALLACE 2,461,097
NUT ANCHOR
Filed April 20, 1943
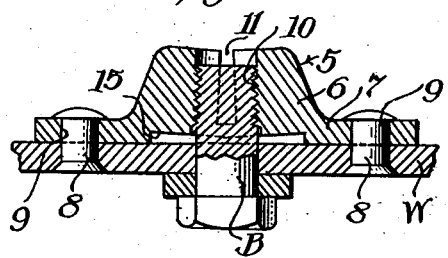
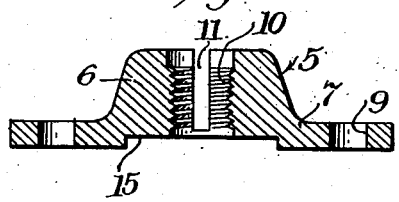
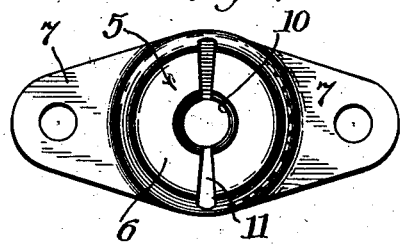
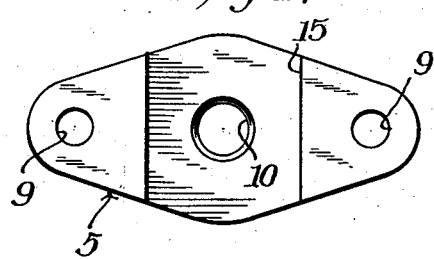
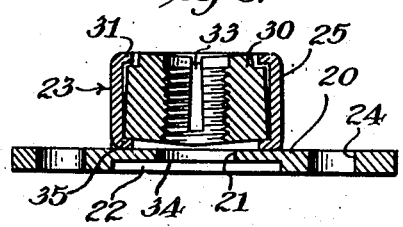
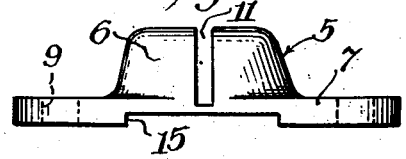
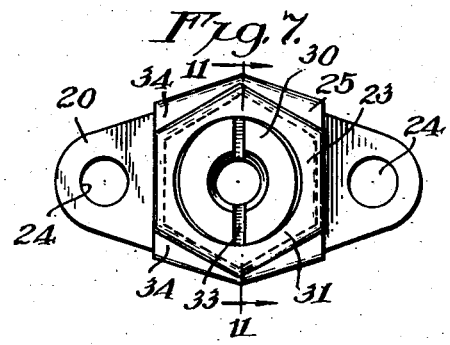
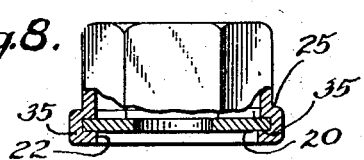
Inventor:
Frank C. Wallace,
By
Attorney Patented Feb. 8, 1949

2,461,097

UNITED STATES PATENT OFFICE 2,461,097

NUT ANCHOR

Frank C. Wallace, Los Angeles, Calif., assignor to
Herman H. Helbush, Los Angeles, Calif.

Application April 20, 1943, Serial No. 483,735

6 Claims. (Cl. 151—21)

This invention relates to anchor nuts, one of the primary objects being to provide an anchor nut which is so designed and constructed as to constrict about the bolt accordingly as the bolt is tightened.

Another object is to provide a device of this character which is capable of being so constructed as to be formed integrally as a one-piece element whereby to reduce vibration, facilitate application and reduce cost of manufacture.

A still further object is to provide a device incorporating advantageous means for housing and fulcruming a slotted nut.

In the accompanying specification and drawings I shall describe and illustrate particular adaptations of my invention and from that description it will become apparent to those skilled in this art how the above-specified objects as well as other advantages inherent in the invention are achieved.

In the drawings:

Fig. 1 is a medial section showing my device applied to work;

Fig. 2 is a medial section showing my device before being applied to work;

Fig. 3 is a top plan view of Fig. 2;

Fig. 4 is a bottom plan view of Fig. 2;

Fig. 5 is a side elevation of Fig. 2;

Fig. 6 is a medial section of a variational form;

Fig. 7 is a top plan view of Fig. 6;

Fig. 8 is a top end view, partly in section, of the device of Figs. 6 and 7.

Anchors of the class to which my invention relates are generally secured, as by rivets, to the inaccessible side of sheets or parts being bound together, a screw or bolt being inserted from the opposite side; the anchor being thus mounted to hold the nut in position to receive the threaded end of the screw or bolt when applied. In its broader aspect, however, my invention contemplates an adaptation as a nut per se.

Referring now to the particular advantages of the invention shown in the drawings and referring first to the form illustrated in Figs. 1 to 5, inclusive, my anchor device is generally designated by the numeral 5 and is shown as comprising a nut-like body 6 having side flanges 7 adapted to be secured to the work W as by rivets 8 passing through holes 9 in the flanges and in registering holes in the work. The body 6 has an internally threaded bore 10 and there is a transverse slot 11 disposed diametrically of the bore, the slot extending entirely through the side walls of the body.

The under surface of the body, which is the work-engaging surface, is plane except for a recess 15 and this recess, together with the slot 11, permits the central portion of the body to flex towards the work W as a bolt B is tightened up in the threaded bore of the body, and as this flexure takes place, the outer end is constricted about the bolt to lock it against vibrating loose (see Fig. 1).

In the form of device shown in Figs. 6, 7 and 11, the device is comprised of a base 20 having an opening 21 and a recess 22 in the under face symmetric with the opening. Here the base has holes 24 to pass rivets for securing the base to the work in the manner before described. Secured to the outer face of the base, in the manner to be described, there is a nut housing 23 having hexagonal side walls 25, the housing being disposed concentric to the opening 21 in the base. A hex nut 30 is mounted in the housing and secured against longitudinal escape therefrom by the outer end of the side wall being flanged as shown at 31, the hex shape of the nut and housing preventing rotation of the nut in the housing. Here the nut 30 is provided with a transverse slot 33 extending diametrically of the threaded throat, the slot extending through the nut. For securing housing 23 to the base, the housing is provided with bottom side flanges 34 which are bent over the side edges of the base and thence under the base into the recess 22. The bottom peripheral portion 35 of the housing between the flanges 34 are bent inwardly whereby to be positioned between the bottom peripheral edge of the nut 30 and the top surface of the base 20. In this form of device, as a bolt or screw is threaded into the throat of the nut and tightened up to draw the nut towards the work, the underlying housing portion 35 acts as a fulcrum to cause the nut to constrict about the screw or bolt, the recess 22 rendering the base relatively flexible to aid this action in the event the bottom of the nut contacts the base.

In the form of my invention hereinabove described I find it preferable to extend the recess in the under face from side to side, as this enables greater flexibility.

While, in the foregoing, I have resorted to considerable detail of structure and association of parts in describing a particular example of my invention, I wish it to be understood that I have done so merely to make my invention understood and that I do not limit my invention to such details. On the contrary, my invention is only to be limited as appears in the appended claims.

I claim:

1. An anchor nut of the class described comprising, in combination, a base having a work-engaging under surface, a nut housing disposed against the outer face of the base, a hole through the base opening into the bottom of the nut housing, a nut non-rotatably carried in the housing, said nut having a threaded bore concentric with the opening in the base, a transverse slot in the nut diametrically of the bore and a recess in the under surface of the base directly under the nut.

2. A device of the class described comprising a base having a work-engaging under face, a hole through the base adapted to pass a screw or the like, a nut housing disposed against the outer surface of the base and having bottom flange means disposed over the side edges of and under the base whereby to secure the housing to the base, and a nut mounted in the housing, said nut having a threaded bore disposed concentric with the hole.

3. A device of the class described comprising a base having a work-engaging under face, a hole through the base adapted to pass a screw or the like, a nut housing disposed against the outer surface of the base, a nut mounted in the housing and having a threaded bore concentric with the hole, a diametric slot in the nut opening through the outer end thereof, and spacer means interposed between diametrically opposite sides of the bottom periphery of the nut and the outer face of the base whereby to space the central portion of the bottom of the nut from the base.

4. A device of the class described comprising a base having a work-engaging under face, a hole through the base adapted to pass a screw or the like, a nut housing disposed against the outer surface of the base, a nut mounted in the housing and having a threaded bore concentric with the hole, a diametric slot in the nut opening through the outer end thereof, and spacer means interposed between diametrically opposite sides of the bottom periphery of the nut and the outer face of the base whereby to space the central portion of the bottom of the nut from the base, said spacer means comprising inwardly disposed flanges on the bottom periphery of the housing.

5. A device of the class described comprising a base having a work-engaging under face, a hole through the base adapted to pass a screw or the like, a nut housing disposed against the outer surface of the base, and a nut mounted in the housing and having a threaded bore concentric with the hole, said housing having bottom, oppositely disposed flanges engaging over the side edges of the base and opposite inwardly disposed bottom flanges projecting between the base and the bottom periphery of the nut.

6. A device of the class described comprising a base having a work-engaging under face, a hole through the base adapted to pass a screw or the like, a transverse recess in the bottom surface of the base, a nut housing disposed against the outer surface of the base, a nut mounted in the housing concentric with the hole, and means securing the housing to the base including oppositely disposed bottom flanges on the housing, said flanges engaging over the side edges of the base and in said recess.

FRANK C. WALLACE.

REFERENCES CITED

The following references are of record in the file of this patent:

UNITED STATES PATENTS

| Number | Name | Date |
| --- | --- | --- |
| 996,725 | Meeners | July 4, 1911 |
| 1,774,081 | Burns | Aug. 26, 1930 |
| 2,204,385 | Schmidt et al. | June 11, 1940 |
| 2,321,497 | Luce | June 8, 1943 |
| 2,336,791 | La Barre | Dec. 14, 1943 |

FOREIGN PATENTS

| Number | Country | Date |
| --- | --- | --- |
| 249 | Great Britain | Jan. 5, 1889 |